United States Patent
Park et al.

(10) Patent No.: US 10,380,092 B2
(45) Date of Patent: Aug. 13, 2019

(54) SERVER, CONTROL METHOD THEREOF, AND SYSTEM FOR PRODUCING RANKINGS OF SEARCH TERMS WHOSE POPULARITIES INCREASE RAPIDLY

(71) Applicant: SAMSUNG ELECTRONICS CO., LTD., Suwon-si (KR)

(72) Inventors: Dong-min Park, Gwacheon-si (KR); Young-jun Kim, Seoul (KR); Ho-dong Lee, Suwon-si (KR); Jong-ho Lea, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 14/695,558

(22) Filed: Apr. 24, 2015

(65) Prior Publication Data
US 2015/0324409 A1 Nov. 12, 2015

(30) Foreign Application Priority Data

May 9, 2014 (KR) .................. 10-2014-0055289

(51) Int. Cl.
*G06F 16/22* (2019.01)
*G06F 16/951* (2019.01)
*G06F 16/2457* (2019.01)

(52) U.S. Cl.
CPC .... *G06F 16/2282* (2019.01); *G06F 16/24578* (2019.01); *G06F 16/951* (2019.01)

(58) Field of Classification Search
CPC .......... G06F 17/30339; G06F 16/2282; G06F 16/24578

(Continued)

(56) References Cited

U.S. PATENT DOCUMENTS 6,321,179 B1 * 11/2001 Glance .................. G06Q 30/02
                                         702/189
7,783,632 B2 * 8/2010 Richardson ....... G06F 17/30864
                                         707/727

(Continued)

FOREIGN PATENT DOCUMENTS

EP       2 031 801 B1    10/2011
JP       2013-11998 A    1/2013

(Continued)

OTHER PUBLICATIONS

Communication dated Jan. 4, 2016 by the European Patent Office in related Application No. 15165600.6.

(Continued)

*Primary Examiner* — Jensen Hu
(74) *Attorney, Agent, or Firm* — Sughrue Mion, PLLC

(57) ABSTRACT

A method of generating popularity rankings of search terms includes generating a ranking value table including ranking values corresponding to rankings of search terms, determining first ranking values corresponding to previous rankings of a plurality of search terms and second ranking values corresponding to current rankings of the plurality of search terms by using the ranking value table, and obtaining difference values based on differences between the first ranking values and the second ranking values of the plurality of search terms, respectively, and determining popularity rankings of the plurality of search terms by using the difference values.

19 Claims, 10 Drawing Sheets

| POPULARITY RANKING | TITLE | PREVIOUS RANKING | CURRENT RANKING | VARIATION |
|---|---|---|---|---|
| 1 | ABC News | 100 | 29 | 71 |
| 2 | Drama Couple | 100 | 51 | 49 |
| 3 | Hot People | 100 | 54 | 46 |
| 4 | Magazine | 100 | 55 | 45 |
| 5 | Current event | 100 | 60 | 40 |
| 6 | World Challenge | 100 | 61 | 39 |
| 6 | DEF NewsDesk | 100 | 61 | 39 |
| 6 | VJ GoGo | 100 | 61 | 39 |
| 6 | Secret of Animals | 45 | 6 | 39 |
| 10 | Music word | 81 | 44 | 37 |

(58) Field of Classification Search
USPC .......................................................... 707/723
See application file for complete search history.

(56) References Cited

U.S. PATENT DOCUMENTS

| | | | |
|---|---|---|---|
| 8,015,185 B2 | 9/2011 | Choi et al. | |
| 8,924,380 B1* | 12/2014 | Koningstein | G06F 17/30696 |
| | | | 707/725 |
| 2009/0182725 A1* | 7/2009 | Govani | G06F 17/30864 |
| 2009/0248614 A1* | 10/2009 | Bhagwan | G06F 17/30864 |
| 2010/0191742 A1 | 7/2010 | Stefik et al. | |
| 2010/0293185 A1 | 11/2010 | Rosado et al. | |
| 2013/0204961 A1* | 8/2013 | Fliam | H04L 67/2885 |
| | | | 709/214 |
| 2013/0254126 A1* | 9/2013 | Koenig | G06Q 10/00 |
| | | | 705/311 |
| 2014/0108393 A1* | 4/2014 | Angwin | G06F 17/30705 |
| | | | 707/731 |

FOREIGN PATENT DOCUMENTS

| | | |
|---|---|---|
| JP | 2013-69246 A | 4/2013 |
| KR | 10-0443483 B1 | 8/2004 |
| KR | 10-1193648 B1 | 12/2012 |
| WO | 2005/114511 A1 | 12/2005 |

OTHER PUBLICATIONS

Communication dated Jan. 13, 2016 by the European Patent Office in related Application No. 15165600.6.
Office Action dated Nov. 22, 2018 by the European Patent Office in counterpart European Patent Application No. 15165600.6.

* cited by examiner

| SEARCH TERM RANKING | VALUABLE VALUE |
|---|---|
| 1 | 0.684295 |
| 2 | 0.674940 |
| 3 | 0.666446 |
| 4 | 0.658678 |
| 5 | 0.651528 |
| 6 | 0.644909 |
| 7 | 0.638753 |
| 8 | 0.633003 |
| 9 | 0.627612 |
| 10 | 0.622539 |
| ⋮ | ⋮ |

FIG. 4

| POPULARITY RANKING | TITLE | PREVIOUS RANKING | CURRENT RANKING | VARIATION |
|---|---|---|---|---|
| 1 | ABC News | 100 | 29 | 71 |
| 2 | Drama Couple | 100 | 51 | 49 |
| 3 | Hot People | 100 | 54 | 46 |
| 4 | Magazine | 100 | 55 | 45 |
| 5 | Current event | 100 | 60 | 40 |
| 6 | World Challenge | 100 | 61 | 39 |
| 6 | DEF NewsDesk | 100 | 61 | 39 |
| 6 | VJ GoGo | 100 | 61 | 39 |
| 6 | Secret of Animals | 45 | 6 | 39 |
| 10 | Music word | 81 | 44 | 37 |

FIG. 5

| POPULARITY RANKING | TITLE | PREVIOUS RANKING | CURRENT RANKING | VARIATION |
|---|---|---|---|---|
| 1 | Secret of Animals | 45 | 6 | 39 |
| 2 | FunFun Sunday | 32 | 7 | 25 |
| 3 | ABC News | 100 | 29 | 71 |
| 4 | The Show | 14 | 1 | 13 |
| 5 | Drama Queen | 23 | 6 | 17 |
| 6 | Drama Couple | 100 | 51 | 49 |
| 6 | Show! Music | 46 | 23 | 23 |
| 6 | Popular Music | 18 | 8 | 10 |
| 6 | Hot People | 100 | 54 | 46 |
| 10 | Music World | 81 | 44 | 37 |

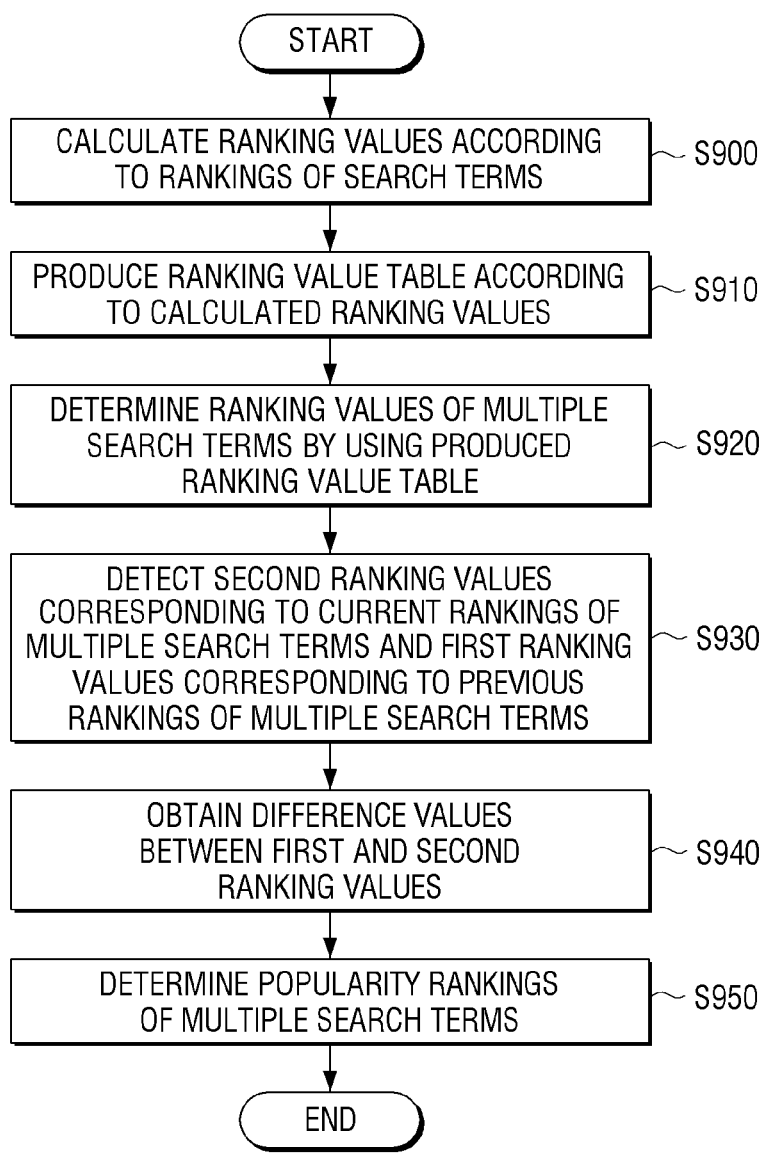

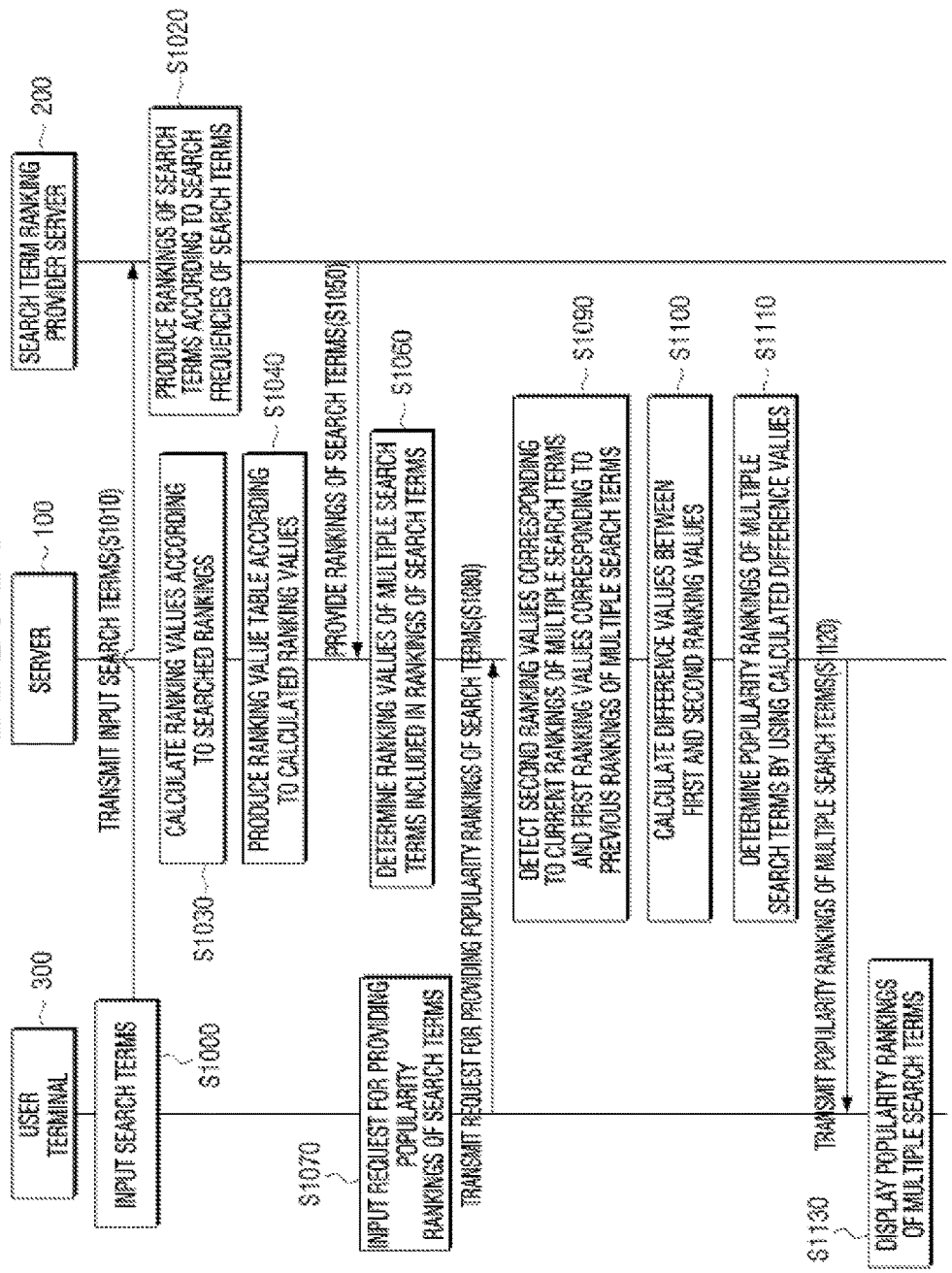

SERVER, CONTROL METHOD THEREOF, AND SYSTEM FOR PRODUCING RANKINGS OF SEARCH TERMS WHOSE POPULARITIES INCREASE RAPIDLY

CROSS-REFERENCE TO RELATED APPLICATION(S)

This application claims priority from Korean Patent Application No. 10-2014-0055289, filed on May 9, 2014, in the Korean Intellectual Property Office, the disclosure of which is incorporated herein by reference in its entirety.

BACKGROUND

1. Field

Apparatuses and methods consistent with exemplary embodiments relate to a server, a control method thereof, and a system for producing rankings of search terms whose popularities increase rapidly, and more particularly, to a server, a control method thereof, and a system for producing the rankings of the search terms whose popularities increase rapidly.

2. Description of the Related Art

According to the widespread use of the Internet, users may search for keywords through search engines or exchange contents, such as images, pictures, or pieces of writing, with other users through social networks.

Therefore, various search engines and/or social network service (SNS) providers frequently provide rankings of search terms according to search frequencies of the search terms. Also, the search engines and/or the SNS providers provide the rankings of the search terms according to use frequencies of the search terms (or keywords) that are mentioned or described in a post through the social networks. Thus, through rankings of the search terms that are determined according to search frequencies or use frequencies, users may recognize various recent issues.

However, rankings of the search terms that are determined according to search frequencies or use frequencies as described above simply provide users with keywords that are currently frequently searched and used. Therefore, it may be difficult for the users to perceive recent changes in issues.

Therefore, there is a need for methods of providing users with search terms whose search frequencies or use frequencies increase rapidly.

SUMMARY

One or more exemplary embodiments provide a server, a control method thereof, and a system for producing rankings of search terms whose popularities increase rapidly based on search frequencies or use frequencies of the search terms.

According to an aspect of an exemplary embodiment, there is provided a method of generating popularity rankings of search terms, the method including: generating a ranking value table including ranking values corresponding to rankings of search terms; determining first ranking values corresponding to previous rankings of a plurality of search terms and second ranking values corresponding to current rankings of the plurality of search terms by using the ranking value table; and obtaining difference values based on differences between the first ranking values and the second ranking values of the plurality of search terms, respectively; and determining popularity rankings of the plurality of search terms by using the difference values.

The ranking values in the ranking value table may have a greater margin of increase in response to an increase in a ranking.

The generating the ranking value table may include dividing the rankings into a plurality of groups, wherein a margin of increase of a ranking value in response to an increase in a ranking in a first group is greater than that in a second group, the second group including rankings lower than rankings of the first group.

The determining the popularity rankings of the plurality of search terms may be performed by using a search term having a difference value higher than or equal to a preset threshold value.

The method may further include receiving at least one of the previous rankings and the current rankings of the plurality of search terms from an external server.

The generating the ranking value table may include calculating the ranking values by using a Zipf-Mandelbrot distribution.

The generating the ranking value table may include calculating the ranking values such that the ranking values have a normal distribution according to the rankings.

According to an aspect of another exemplary embodiment, there is provided a server including: a storage configured to store a ranking value table including ranking values corresponding to rankings of search terms; and a controller configured to determine first ranking values corresponding to previous rankings of a plurality of search terms and second ranking values corresponding to current rankings of the plurality of search terms by using the ranking value table, obtain difference values based on differences between the first ranking values and the second ranking values of the plurality of search terms, respectively; and determine popularity rankings of the plurality of search terms by using the difference values.

The controller may be configured to generate the ranking value table by calculating the ranking values to have a greater margin of increase in response to an increase in a ranking.

The controller may be configured to generate the ranking value table by dividing the rankings into a plurality of groups, wherein a margin of increase of a ranking value according to an increase in a ranking in a first group is greater than that in a second group, the second group including rankings lower than rankings of the first group.

The controller may be configured to determine the popularity rankings of the plurality of search terms by using a search term having a difference value higher than or equal to a preset threshold value.

The server may further include a communicator configured to receive at least one of the previous rankings and the current rankings of the plurality of search terms from an external server.

The controller may be configured to calculate the ranking values by using a Zipf-Mandelbrot distribution.

The controller may be configured to calculate the ranking values to have a normal distribution according to the rankings.

The server may further include a communicator configured to receive the plurality of search terms from a plurality of user terminals, wherein the controller is configured to determine rankings of the plurality of search terms based on frequencies of the plurality of search terms occurring on the plurality of user terminals.

The controller may be configured to determine the ranking of the plurality of search terms according to a predetermined time period.

The controller may be configured to provide the popularity rankings of the plurality of search terms to a user terminal upon request from the user terminal.

According to an aspect of still another exemplary embodiment, there is provided a system for generating popularity rankings of search terms, the system including: a plurality of user terminals; a search term ranking provider server configured to transmit rankings of a plurality of search terms according to frequencies of the plurality of search terms being searched by the plurality of user terminals; and a server configured to generate a ranking value table including ranking values corresponding to rankings of search terms, determine first ranking values corresponding to previous rankings of the plurality of search terms and second ranking values corresponding to current rankings of the plurality of search terms, obtain difference values based on differences between the first ranking values and the second ranking values of the plurality of search terms, respectively, and determine popularity rankings of the plurality of search terms by using the difference values.

The server may be installed in one of the plurality of user terminals.

The ranking values of the ranking value table may have a greater margin of increase in response to an increase in a ranking.

BRIEF DESCRIPTION OF THE DRAWINGS

The above and/or other aspects will be more apparent by describing certain exemplary embodiments with reference to the accompanying drawings, in which:

FIG. 3 is a view illustrating a ranking value table according to an exemplary embodiment;

FIG. 4 is a view illustrating rankings of search terms whose popularities increase rapidly according to an exemplary embodiment;

FIG. 5 is a view illustrating rankings of search terms whose popularities increase rapidly according to another exemplary embodiment;

FIG. 9 is a flowchart illustrating a method of controlling a server, according to an exemplary embodiment; and FIG. 10 is a view illustrating a method of producing rankings of search terms whose popularities increase rapidly, according to an exemplary embodiment.

DETAILED DESCRIPTION

Figure 1:
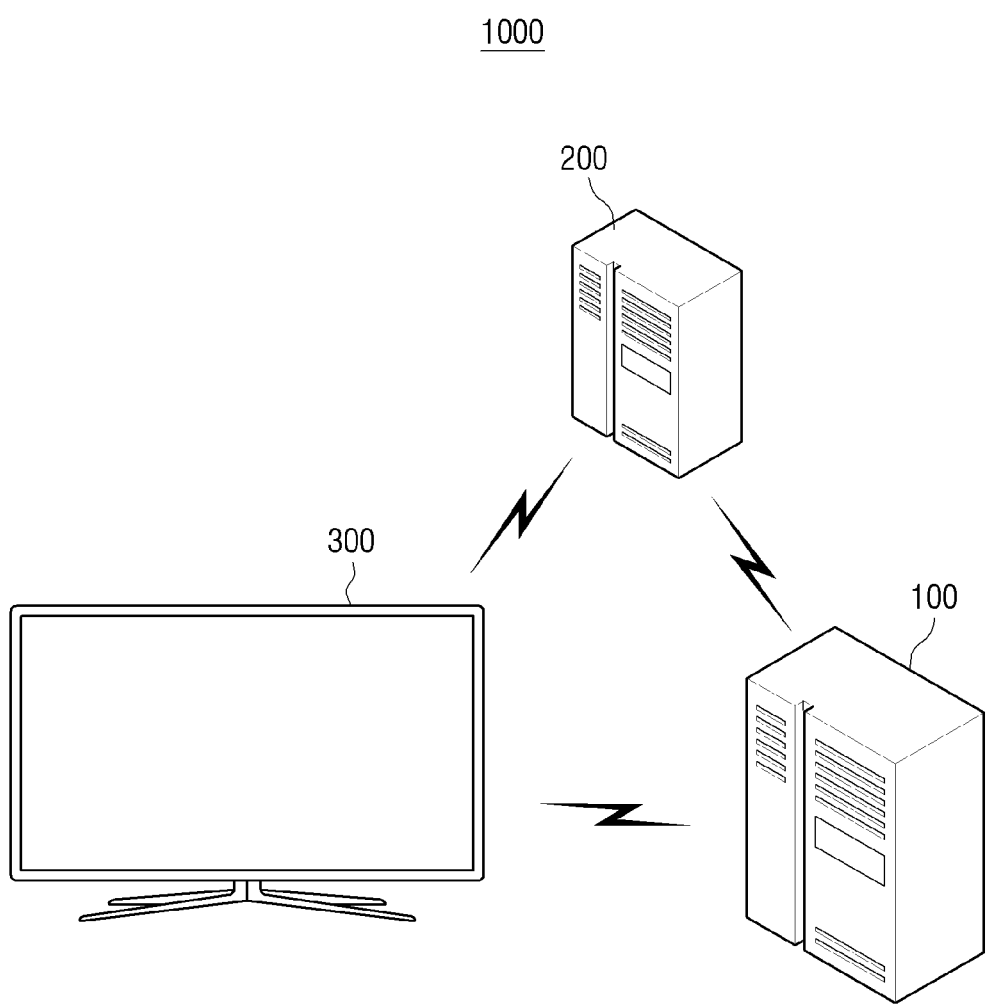
FIG. 1 is a view illustrating a system for producing rankings of search terms whose popularities increase rapidly, according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they may obscure the exemplary embodiments with unnecessary detail.

FIG. 1 is a view illustrating a system 1000 for producing rankings (or popularity rankings) of search terms whose popularities increase rapidly, according to an exemplary embodiment. Referring to FIG. 1, the system 1000 includes a server 100, a search term ranking provider server 200, and a user terminal 300.

The server 100 produces popularity rankings of search terms whose popularities increase rapidly and is installed outside the user terminal 300 as shown in FIG. 1. However, this is only an example, and thus the server 100 may be installed in the user terminal 300.

The server 100 and the search term ranking provider server 200 are separately installed as shown in FIG. 1. However, the search term ranking provider server 200 may not be separately installed, and the server 100 may produce rankings (or search term rankings) of search terms based on search or use frequencies of the search terms and produce popularity rankings of search terms whose popularities increase rapidly, by using the produced search term rankings.

The user terminal 300 is illustrated as a television (TV) in FIG. 1, but this is only an example. For example, the user terminal 300 may be realized as various types of electronic devices such as a portable phone, a tablet personal computer (PC), a digital camera, a camcorder, a notebook PC, a personal digital assistant (PDA), etc. Also, one user terminal 300 is illustrated in FIG. 1, but a plurality of user terminals 300 may be provided.

The user terminal 300 may receive search terms or contents such as pictures or texts from a user through a search engine, a social network, or the like.

The user terminal 300 may also display search term rankings provided from the search term ranking provider server 200. For example, if a user accesses a portal site, the user terminal 300 may display search term rankings that are provided to the portal site by the search term ranking provider server 200.

The search term ranking provider server 200 is a server that produces and provides the search term rankings. In other words, the search term ranking provider server 200 may calculate search frequencies or use frequencies of keywords included in search terms or contents that are input from the user through the user terminal 300, to produce the search term rankings. The search term ranking provider server 200 may produce the search term rankings according to categories of search terms. For example, the search term ranking provider server 200 may calculate frequencies of particular categories of search terms used by the user, such as movies or politicians, to produce the search term rankings.

The search term ranking provider server 200 may operate in association with a portal site or an application that provides search term rankings. Alternatively, the search term ranking provider server 200 may transmit the produced search term rankings to the portal site or the application at one time.

Figure 2:
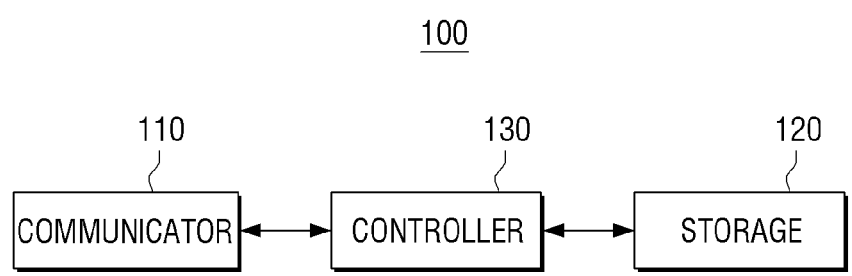
FIG. 2 is a block diagram illustrating a structure of a server according to an exemplary embodiment.

The server 100 produces rankings (or popularity rankings) of search terms whose popularities increase rapidly. A detailed structure of the server 100 is as shown in FIG. 2. As shown in FIG. 2, the server 100 includes a communicator 110, a storage 120, and a controller 130.

The communicator 110 is an element that communicates with an external device. In particular, the server 100 may communicate with an external server such as the search term ranking provider server 200 or the user terminal 300 through the communicator 110.

For example, the communicator 110 may receive search term rankings including a plurality of search terms from the search term ranking provider server 200. The communicator 110 may also transmit the popularity rankings of the search terms which are produced by the server 100 and whose popularities increase rapidly.

The storage 120 is an element that stores a plurality of search terms received from the external device. In particular, the storage 120 may store the search term rankings received from the search term ranking provider server 200. The storage 120 may also store a ranking value table that is produced according to ranking values calculated by the server 100.

The storage 120 may also store various types of elements for driving the server 100. For example, the storage 120 may store a program code and/or instruction for calculating ranking values according to rankings of search terms, a program code and/or instruction for producing a ranking value table according to the ranking values, a program code and/or instruction for calculating difference values between ranking values of previous and current rankings, etc.

The controller 130 controls an overall operation of the server 100. In particular, the controller 130 may calculate ranking values according to rankings of search terms and produce a ranking value table according to the calculated ranking values. The ranking values are relative values corresponding to the respective rankings of the search terms. The controller 130 may calculate the ranking values such that a margin of increase in the ranking values increases according to an increase in the rankings of the search term rankings and produce the valuable value table based on the calculated ranking values. The controller 130 may calculate the ranking values by using, for example, a Zipf-Mandelbrot distribution.

For example, there is a nine ranking difference between a 1st ranking and a 10th ranking, and there is also a nine ranking difference between a 91st ranking and a 100th ranking. That is, differences in the rankings are the same. However, if a ranking value of the 1st ranking is 10, a ranking value of the 10th ranking is 5, a ranking value of the 91st ranking 2, and a ranking value of the 100th ranking is 1, differences in the ranking values between the 1st ranking and the 10th ranking and between the 91st ranking and the 100th ranking are 5 and 1, respectively. In other words, the controller 130 may calculate the ranking values such that the ranking values increase more in response to an increase of ranking from 10th to 1st than an increase of ranking from 100th to 91st. A detailed method of calculating the ranking values will be described later.

The controller 130 may divide the rankings into a plurality of groups and generate the ranking value table in which an increase margin of a ranking value according to the ranking of the search term is higher at a first group (or higher search term ranking group) than at a second group (or lower search term ranking group), wherein the second group includes lower rankings than those included in the first group. For example, the controller 130 may divide rankings into the first group including 1st to 100th rakings and the second group including $101^{st}$ to 200th rankings and produce the ranking value table. In this case, for example, a difference in ranking values according to a 30th ranking difference is greater in the first group than a difference in ranking values according to a 30th ranking difference in the second group. In other words, for example, the controller 130 may produce the ranking value table in which a difference in the ranking value between a 1st ranking and a 31st ranking may be greater than a difference in the ranking value between a 120th ranking and a 150th ranking.

The controller 130 may also determine ranking values of a plurality of search terms corresponding to search term rankings received from the search term ranking provider server 200, by using the ranking value table.

For example, if the controller 130 produces the ranking value table in which a ranking value of a 1st ranking is 10, a ranking value of a 2nd ranking is 6, a ranking value of a 3rd ranking is 4, a ranking value of a 4th ranking is 3, and a ranking value of a 5th ranking is 2.5 and receives rankings indicating that a 1st ranking is a search term A, a 2nd ranking is a search term B, a 3rd ranking is a search term C, a 4th ranking is a search term D, and a 5th ranking is a search term E, the controller 130 may respectively match the ranking values of the ranking value table with the search terms of the respective rankings. In other words, the controller 130 may determine a ranking value of the search term A of the 1st ranking as 10, a ranking value of the search term B of the 2nd ranking as 6, a ranking value of the search term C of the 3rd ranking as 4, a ranking value of the search term D of the 4th ranking as 3, and a ranking value of the search term E of the 5th ranking as 2.5.

The controller 130 may detect first ranking values corresponding to previous rankings of the plurality of search terms and second ranking values corresponding to current rankings of the plurality of search terms.

In other words, after the controller 130 determines ranking values of the search terms as described above and a preset time passes, the controller 130 may again receive search term rankings and detect current rankings of the search terms. The controller 130 may detect a ranking value corresponding to a previous ranking as a first ranking value and a ranking value corresponding to a current ranking as a second ranking value. Time intervals at which the controller 130 determines ranking values may be adjusted according to setting of the server 100.

For example, if a current ranking of the search term E is 1, the server 100 may detect a second ranking value of the search term E as 10 and a first ranking value of the search term E as 2.5.

The controller 130 may also calculate a difference between the first ranking value and the second ranking value to calculate a difference value. In other words, in the above-described exemplary embodiment, the controller 130 may detect a difference value of the search term E as 7.5.

The controller 130 may determine popularity rankings of a plurality of search terms whose popularities increase rapidly, by using the calculated difference value. To this end, the controller 130 may determine difference values of the plurality of search terms by using the above-described method. The controller 130 may also determine the popularity rankings of the search terms according to an order of the difference values. Also, the controller 130 may determine the popularity rankings of the search terms by using a search term having a difference value higher than or equal to a preset threshold value. For example, if there are one hundred search terms having increased ranking values, the controller 130 may determine the popularity rankings of the search terms by using only a search term having a different value higher than or equal to a preset threshold value among the one hundred search terms.

However, calculating the ranking values such that increase margins of the ranking values increases according to an increase in rankings are only an exemplary embodiment. For example, in another exemplary embodiment, the controller 130 may calculate the ranking values to have a normal distribution according to rankings.

A method of determining popularity rankings of search terms whose popularities increase rapidly will now be described in detail with reference to FIGS. 3 through 5.

FIG. 3 is a view illustrating a ranking value table 400 according to an exemplary embodiment. In other words, the server 100 may calculate ranking values according to rankings (or search term rankings) of search terms and produce the ranking value table 400 according to the calculated ranking values. The ranking values refer to relative values corresponding to the respective rankings of the search terms. In particular, the controller 130 may calculate the ranking values such that margins of increase of the ranking values increase according to an increase in the rankings of the search terms. In an exemplary embodiment, the controller 130 may calculate the ranking values by using the Zipf-Mandelbrot distribution.

A method of calculating the ranking values by using the Zipf-Mandelbrot distribution will now be described in detail. Difference values that indicate differences between the ranking values of the previous and current rankings of a search term may be calculated by using Equation 1 below:

$$\frac{1/(k2+q)^s}{H} - \frac{1/(k1+q)^s}{H}, \quad (1)$$

wherein k and k denote rankings.

In an exemplary embodiment, k denotes a previous ranking of a search term, and k2 denotes a current ranking of the search term after an elapse of a preset time from when the previous ranking is determined. Also, q, s, and H denote constants.

The difference values may be acquired by using subtraction operations of Equation 1, while neglecting the same denominator, i.e., constant H. If the constant H is neglected, the difference values may be calculated by using Equation 2 below:

$$\frac{1}{(k2+q)^s} - \frac{1}{(k1+1)^s} \quad (2)$$

To acquire constants q and s, the server 100 may use examples of rankings determined to have the same difference values therebetween.

For example, if a difference value between ranking values of a 45th ranking and a 5th ranking, a difference value between ranking values of a 120th ranking and a 20th ranking, and a difference value between ranking values of a 240th ranking and a 40th ranking are determined to be the same value, Equation 3 is satisfied.

$$\frac{1}{(5+q)^s} - \frac{1}{(45+q)^s} = \quad (3)$$
$$\frac{1}{(20+q)^s} - \frac{1}{(120+q)^s} = \frac{1}{(40+q)^s} - \frac{1}{(240+q)^s}$$

The server 100 may use Equation 3 above to acquire values of constant q and s. In other words, q is acquired as 10, and s is acquired as 0.158208 by Equation 3 above. Therefore, the server 100 may calculate ranking values of all rankings by Equation 4 below using the acquired values of the constants q and s:

$$\frac{1}{(k+10)^{0.158208}}, \quad (4)$$

wherein k denotes a ranking.

If the server 100 calculates ranking values by using Equation 4, the ranking value table 400 as shown in FIG. 3 is produced. Calculating a ranking value table by using the Zipf-Mandelbrot distribution is only an exemplary embodiment, and thus the server 100 may produce the ranking value table by using various methods. Also, even when the Zipf-Mandelbrot distribution is used, the server 100 may control values of the constants q and s of Equation 2 above to change. The server 100 may also calculate the ranking values to have a normal distribution according to rankings.

FIG. 4 is a view illustrating a table including popularity rankings of search terms according to variations between current and previous rankings. In other words, in the table shown in FIG. 4, search terms are arranged in a descending order of variations (or differences) between the current and previous rankings.

A user may have an interest in a search term having a ranking that increases from 20th to 1st than a search term having a ranking that increases from 1000th to 900th or from 100th to 60th. However, when the search terms are arranged according to the variations in rankings as shown in FIG. 4, the user may have difficulty in determining which search term ranking increases rapidly from a previous higher ranking. For example, as shown in FIG. 4, search terms, such as "World Challenge", "DEF NewsDesk", and VJ GoGO" of which search term rankings increase from 100th to 61st, and a search term, such as "Secret of Animals" of which search term ranking increases from 45th to 6th, have the same popularity ranking. Therefore, the user may not know which search term increases rapidly from a previous higher ranking.

FIG. 5 is a view illustrating a table including popularity rankings of search terms whose popularities increase rapidly and which are produced based on ranking values of the search terms. In the table as shown in FIG. 5, a search term having a greater difference between the ranking values of the previous and current rankings of the search term may be ranked higher.

In detail, in case of the search term "Secret of Animals" having the previous and current rankings of 45th and 6th, respectively, a difference value of 0.114439 is obtained by using Equation 4.

In case of the search term "ABC News" having the previous and current rankings of 100th and 29th, respectively, a difference value of 0.084746 is obtained by using Equation 4.

As above, an increase margin of the search term ranking of the search term "ABC News" is higher than an increase margin of the search term ranking of the search term "Secret of Animals". However, a difference value, i.e., a difference between ranking values of the previous and current rankings of the search term "ABC News" is lower than a difference value of the search term "Secret of Animals". Therefore, the search term "ABC News" is ranked lower than the search term "Secret of Animals" with respect to the popularity rankings of search terms.

In the case of the search term "The Show", a search term ranking increases by 13 from a previous ranking of 14th to a current ranking of 1st, and thus an increase margin is not relatively high. However, the increase in the ranking of the search term "The Show" is an increase from the previous relatively high ranking, and a difference value of a ranking value is acquired as 0.079456 by Equation 4 above. Therefore, the difference value of the search term "The Show" is higher than a difference value of 0.069789 of a search term "Drama Queen" that increases from a previous ranking of 23rd to a current ranking 6th. As a result, the search term "The Show" is ranked higher than the search term "Drama Queen" with respect to the popularity rankings of the search terms.

According to the above-described method of producing popularity rankings of search terms whose popularities increase rapidly, the user may obtain the popularity rankings based on search terms in a higher search term ranking group and search terms in a lower search term ranking group.

Also, the server 100 may produce and store only a ranking value table without using an additional database (DB) to rapidly produce popularity rankings of search terms whose popularities increase rapidly.

Figure 6:
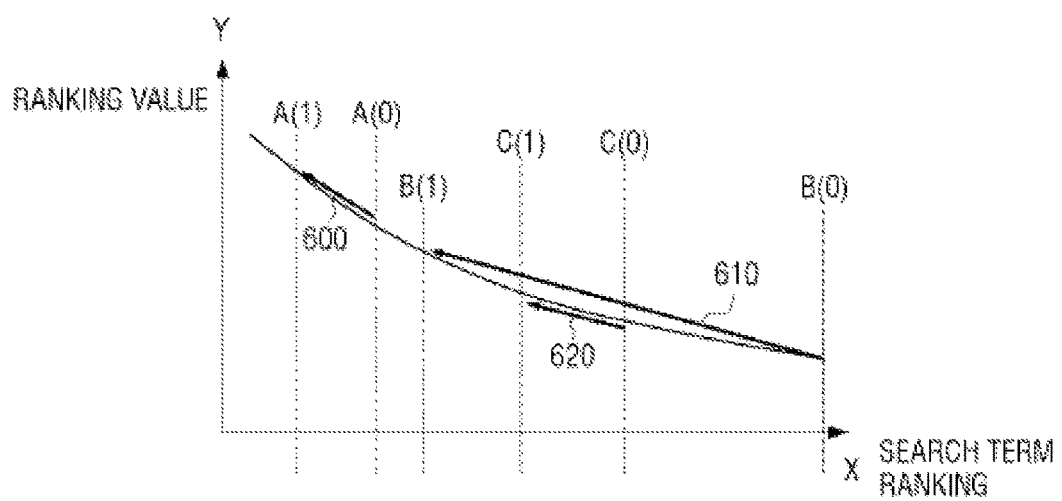
FIGS. 6, 7, and 8 are graphs illustrating relationships between ranking values and search term rankings according to exemplary embodiments.
Figure 7:
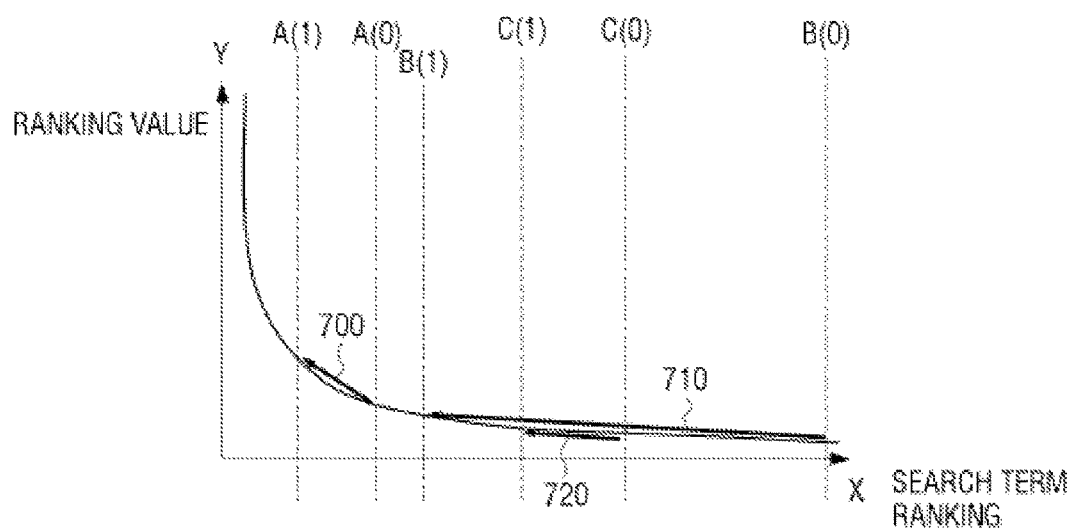
Figure 8:
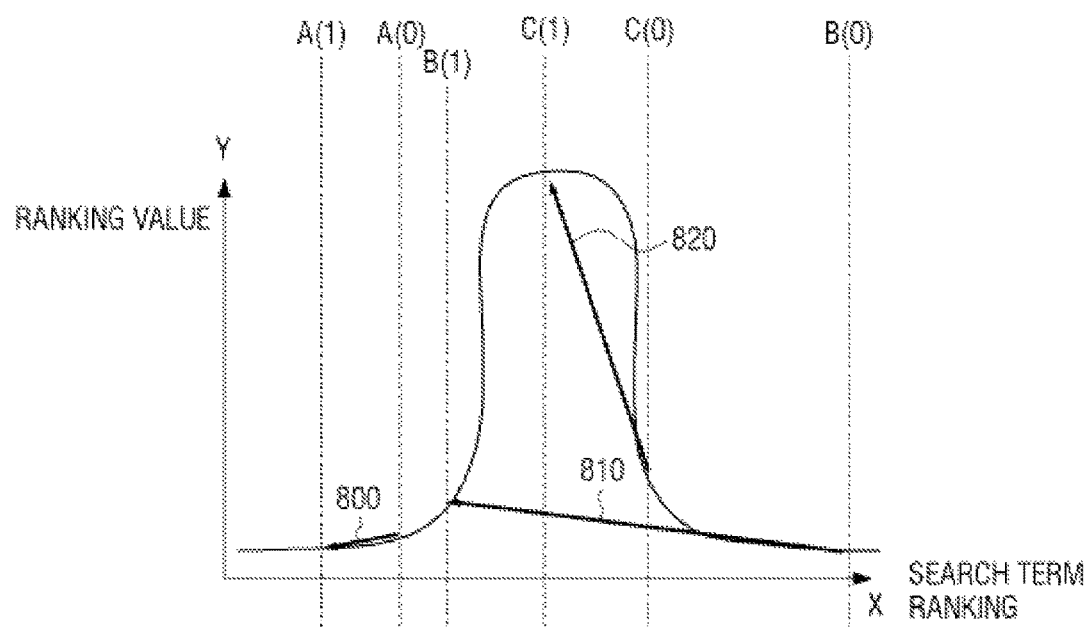

FIGS. 6, 7, and 8 are graphs illustrating relationships between ranking values and search term rankings according to exemplary embodiments. The server 100 may use various relationships between ranking values and search term rankings according to categories of search terms, policies, or user setting. In the graphs as shown in FIGS. 6 through 8, a higher X axis value represents a lower search term ranking of a search term.

FIG. 6 is a graph illustrating a case in which increase margins of ranking values increase according to an increase in search term rankings of the search terms. In FIG. 6, an increase margin 600 of a ranking value according to a change from a previous ranking A(0) to a current ranking A(1) of a search term A, an increase margin 610 of a ranking value according to a change from a previous ranking B(0) to a current ranking B(1) of a search term B, and an increase margin 620 of a ranking value according to a change from a previous ranking C(0) to a current ranking C(1) of a search term C are shown. As shown in FIG. 6, an increase margin of a ranking (i.e., from the previous ranking A(0) to the current ranking A(1)) of the search term A included in a higher search term ranking group is not relatively high. An increase margin of a ranking (i.e., from the previous ranking B(0) to the current ranking B(1)) of the search term B included in a lower search term ranking group is relatively high. In other words, although an increase margin of a ranking value with respect to an increase in a ranking is relatively low in a lower search term ranking group, the increase margin 610 of the ranking value of the search term B is relatively high because the increase margin of the ranking of the search term B is relatively high. Therefore, a variation in the ranking value of the search term B is higher than a variation of the ranking value of the search term A. Therefore, the search term B may be ranked higher than the search term A with respect to the popularity rankings.

FIG. 7 is a graph illustrating a case in which increase margins of ranking values rapidly increases in a higher search term ranking group. In FIG. 7, an increase margin 700 of a ranking value according to a change from the previous ranking A(0) to the current ranking A(1) of the search term A, an increase margin 710 of a ranking value according to a change from the previous ranking B(0) to the current ranking B(1) of the search term B, and an increase margin 720 of a ranking value according to a change from the previous ranking C(0) to the current ranking C(1) of the search term C are shown. As shown in FIG. 7, an increase margin of a ranking (i.e., from the previous ranking A(0) to the current ranking A(1)) of the search term A included in a higher search term group is not relatively high, and an increase margin of a ranking (i.e., from the previous ranking B(0) to the current ranking B(1)) of the search term B included in a lower search term ranking group is relatively high. However, variations in ranking values increase rapidly in the higher search term ranking group. Therefore, the search term A may be ranked higher than the search term B with respect to the popularity rankings.

FIG. 8 is a graph illustrating a case in which the ranking values have a normal distribution according to rankings. In this case, in a higher search term group, the ranking values may decrease in response to an increase in the rankings. In other words, when a ranking of the search term A increases, a ranking value of the search term A decreases, as shown in a margin 800. An increase margin of a ranking (i.e., from the previous ranking C(0) to the current ranking C(1)) of the search term C in an intermediate search term ranking group is not relatively high, but a ranking value of the search term C forms a normal distribution according to the ranking. Therefore, an increase margin 820 of the ranking value of the search term C is relatively high. As a result, the search term C may be ranked the highest with respect to the popularity rankings.

FIG. 9 is a flowchart illustrating a method of controlling the server 100, according to an exemplary embodiment.

In operation S900, the server 100 calculates ranking values according to rankings of search terms. In operation S910, the server 100 produces a ranking value table according to the calculated ranking values. In other words, the server 100 may calculate the ranking values according to the rankings and produce the ranking value table according to the calculated ranking values. The ranking values refer to relative values corresponding to the respective rankings of the search terms. In particular, the server 100 may calculate the ranking values such that increase margins of the ranking values increase according to an increase in the rankings of the search terms. Also, the controller 130 may calculate the ranking values by using the Zipf-Mandelbrot distribution. However, this is only an exemplary embodiment, and thus the server 100 may calculate the ranking values such that a substantially uniform distribution of the ranking values is formed according to the rankings.

In operation S920, the server 100 determines ranking values of a plurality of search terms by using the produced ranking value table. In operation S930, the server 100 determines first ranking values corresponding to previous rankings of the plurality of search terms and second ranking values corresponding to current rankings of the plurality of search terms. Time intervals at which the server 100 calculates the first and/or second ranking values may be different according to user setting or initial setting of the server 100.

In operation S940, the server 100 obtains difference values between the first ranking values and the second ranking values. In operation S950, the server 100 determines popularity rankings of the plurality of search terms whose popularities increase rapidly by using the calculated difference values. In other words, the server 100 may determine the popularity rankings of the plurality of search terms according to an order of the difference values. Also, the server 100 may determine the popularity rankings of the search terms by using search terms having difference values higher than or equal to a preset threshold value. For example, if one hundred search terms have increased ranking values, the rankings of the search terms may be determined by using only search terms having difference values higher than or equal to a preset threshold value among the one hundred search terms.

FIG. 10 is a view illustrating a method of producing popularity rankings of search terms whose popularities increase rapidly, according to an exemplary embodiment. Here, the server 100 produces the popularity rankings of the search terms whose popularities increase rapidly and is installed separately from the user terminal 300, but this is only an exemplary embodiment. For example, the server 100 may be installed in the user terminal 300.

The server 100 and the search term ranking provider server 200 are illustrated as separate servers. However, the search term ranking provider server 200 may not be separately installed from the server 100, and the server 100 may produce rankings of search terms and produce popularity rankings of search terms whose popularities increase rapidly, by using the produced rankings of the search terms.

The user terminal 300 may be provided in various types of electronic devices including displays such as a television (TV), a mobile phone, etc.

In operation S1000, the user terminal 300 receives an input of search terms. In operation S1010, the user terminal 300 transmits the input search terms to the search term ranking provider server 200. In operation S1020, the search term ranking provider server 200 produces rankings of the search terms according to, for example, search frequencies or use frequencies of search terms among a plurality of user terminals 300.

The server 100 calculates ranking values according to the rankings of the search terms in operation S1030, and produces a ranking value table according to the calculated ranking values in operation S1040. For example, the server 100 may calculate the ranking values according to the rankings using the above-described Equations 3 and 4.

In operation S1050, the server 100 receives the rankings of the search terms from the search term ranking provider server 200. In operation S1060, the server 100 determines ranking values of a plurality of search terms included in the rankings of the search terms.

In operation S1070, the user terminal 300 inputs a request for providing popularity rankings of search terms whose popularities increase rapidly. In operation S1080, the user terminal 300 transmits the request to the server 100.

In operation S1090, the server 100 detects first ranking values corresponding to previous rankings of the plurality of search terms and second ranking values corresponding to current rankings of the plurality of search terms. In operation S1100, the server 100 calculates difference values based on differences between the first ranking values and the second ranking values. In operation S1110, the server 100 determines the popularity rankings of the plurality of search terms whose popularities increase rapidly, by using the calculated difference values.

In operation S1120, the server 100 transmits the popularity rankings of the search terms whose popularities increase rapidly, to the user terminal 300. In operation S1130, the user terminal 300 displays the popularity rankings of the search terms whose popularities increase rapidly.

According to a method of producing popularity rankings of search terms whose popularities increase rapidly as described above, a user may obtain the popularity rankings based on search terms in a higher search term ranking group and search terms in a lower search term ranking group, in which rankings of the search terms in the lower search term ranking group need to increase by a higher margin than the search terms in the higher search term ranking group to be ranked higher with respect to the popularity rankings.

According to various exemplary embodiments, a user may obtain keywords having rapidly increased search or use frequencies.

A method of controlling a server according to various exemplary embodiments may be coded as software and stored on a non-transitory readable medium. The non-transitory readable medium may be installed and used in various types of devices.

The non-transitory computer-readable medium refers to a medium which does not store data for a short time such as a register, a cache memory, a memory, or the like but semi-permanently stores data and is readable by a computer. In detail, the above-described applications or programs may be stored and provided on a non-transitory computer readable medium such as a compact disk (CD), a digital versatile disk (DVD), a hard disk, a blue-ray disk, a universal serial bus (USB), a memory card, a read only memory (ROM), or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of generating popularity rankings of search terms, the method comprising:
generating a ranking value table including ranking values corresponding to rankings of search terms;
identifying first ranking values corresponding to previous rankings of a plurality of search terms and second ranking values corresponding to current rankings of the plurality of search terms by using the ranking value table;
obtaining difference values based on differences between the first ranking values and the second ranking values of the plurality of search terms, respectively;
identifying popularity rankings of the plurality of search terms by using the difference values; and
providing the popularity rankings of the plurality of search terms to a user terminal upon a request from the user terminal
wherein the generating the ranking value table comprises:
identifying two or more pairs each including a first ranking, which is a previous ranking, and a second ranking, which is a current ranking, the first ranking and the second ranking of each pair being designated to have the same ranking difference therebetween;
generating ranking values for the identified two or more pairs by comparing the first ranking of each pair and, for a pair having a higher first ranking, providing a higher ranking value to the second ranking of the pair; and
generating the ranking value table based on the generated ranking values.

2. The method of claim 1, wherein the ranking values in the ranking value table have a greater margin of increase in response to an increase in a ranking.

3. The method of claim 1, wherein the generating the ranking value table comprises:
dividing the rankings into a plurality of groups, wherein a margin of increase of a ranking value in response to an increase in a ranking in a first group is greater than that in a second group, the second group comprising rankings lower than rankings of the first group.

4. The method of claim 1, wherein the determining the popularity rankings of the plurality of search terms is performed by using a search term of which ranking values of the previous ranking and the current ranking has a difference value higher than or equal to a preset threshold value.

5. The method of claim 1, further comprising:
receiving at least one of the previous rankings and the current rankings of the plurality of search terms from an external server.

6. The method of claim 1, wherein the generating the ranking value table comprises calculating the ranking values by using a Zipf-Mandelbrot distribution.

7. The method of claim 1, wherein the generating the ranking value table comprises calculating the ranking values such that the ranking values have a normal distribution according to the rankings.

8. A server comprising:
a storage configured to store a ranking value table including ranking values corresponding to rankings of search terms; and
a controller configured to identify first ranking values corresponding to previous rankings of a plurality of search terms and second ranking values corresponding to current rankings of the plurality of search terms by using the ranking value table, obtain difference values based on differences between the first ranking values and the second ranking values of the plurality of search terms, respectively; identify popularity rankings of the plurality of search terms by using the difference values; and provide the popularity rankings of the plurality of search terms to a user terminal upon a request from the user terminal
wherein the controller is further configured to identify two or more pairs each including a first ranking, which is a previous ranking, and a second ranking, which is a current ranking, ranking values of the first ranking and the second ranking of each pair being designated to have the same ranking difference therebetween,
wherein the controller is further configured to generate ranking values for the identified two or more pairs by comparing the first ranking of each pair and, for a pair having a higher first ranking, providing a higher ranking value to the second ranking of the pair and generate the ranking value table based on the generated ranking values.

9. The server of claim 8, wherein the controller is configured to generate the ranking value table by calculating the ranking values to have a greater margin of increase in response to an increase in a ranking.

10. The server of claim 8, wherein the controller is configured to generate the ranking value table by dividing the rankings into a plurality of groups, wherein a margin of increase of a ranking value according to an increase in a ranking in a first group is greater than that in a second group, the second group comprising rankings lower than rankings of the first group.

11. The server of claim 8, wherein the controller is configured to determine the popularity rankings of the plurality of search terms by using a search term of which ranking values of the previous ranking and the current ranking has a difference value higher than or equal to a preset threshold value.

12. The server of claim 8, further comprising a communicator configured to receive at least one of the previous rankings and the current rankings of the plurality of search terms from an external server.

13. The server of claim 8, wherein the controller is configured to calculate the ranking values by using a Zipf-Mandelbrot distribution.

14. The server of claim 8, wherein the controller is configured to calculate the ranking values to have a normal distribution according to the rankings.

15. The server of claim 8, further comprising a communicator configured to receive the plurality of search terms from a plurality of user terminals, wherein the controller is configured to determine rankings of the plurality of search terms based on frequencies of the plurality of search terms occurring on the plurality of user terminals.

16. The server of claim 15, wherein the controller is configured to determine the ranking of the plurality of search terms according to a predetermined time period.

17. A system for generating popularity rankings of search terms, the system comprising:
a plurality of user terminals;
a search term ranking provider server configured to transmit rankings of a plurality of search terms according to frequencies of the plurality of search terms being searched by the plurality of user terminals; and
a server configured to generate a ranking value table including ranking values corresponding to rankings of search terms, identify first ranking values corresponding to previous rankings of the plurality of search terms and second ranking values corresponding to current rankings of the plurality of search terms, obtain difference values based on differences between the first ranking values and the second ranking values of the plurality of search terms, respectively, identify popularity rankings of the plurality of search terms by using the difference values, and provide the popularity rankings of the plurality of search terms to a user terminal upon a request from the user terminal,
wherein the server is configured to generate the ranking value table by performing:
identifying two or more pairs each including a first ranking, which is a previous ranking, and a second ranking, which is a current ranking, the first ranking and the second ranking of each pair being designated to have the same ranking difference therebetween;
generating ranking values for the identified two or more pairs by comparing the first ranking of each pair and, for a pair having a higher first ranking, providing a higher ranking value to the second ranking of the pair; and
generating the ranking value table based on the generated ranking values.

18. The system of claim 17, wherein the server is installed in one of the plurality of user terminals.

19. The system of claim 17, wherein the ranking values of the ranking value table have a greater margin of increase in response to an increase in a ranking.

* * * * *